Oct. 15, 1929.    C. T. HIBBARD    1,731,462
STARTING SWITCH FOR SYNCHRONOUS MOTORS
Filed Nov. 23, 1926

INVENTOR
Charles Truman Hibbard
BY
ATTORNEYS

Patented Oct. 15, 1929

1,731,462

UNITED STATES PATENT OFFICE

CHARLES TRUMAN HIBBARD, OF MINNEAPOLIS, MINNESOTA, ASSIGNOR TO ELECTRIC MACHINERY MFG. COMPANY, OF MINNEAPOLIS, MINNESOTA, A CORPORATION OF MINNESOTA

STARTING SWITCH FOR SYNCHRONOUS MOTORS

Application filed November 23, 1926. Serial No. 150,225.

This invention relates to starting systems for electric motors, particularly to automatic or semi-automatic starting systems for synchronous motors, and has for its object the provision of improved means for actuating magnetic contactors in a control system for starting and protecting synchronous motors during normal and abnormal operating conditions.

Ordinarily, the magnetic contactors employed to establish the connection for a synchronous motor are operated by alternating current supplied from the line or other suitable source. The contactors are usually held closed by the action of the magnet coils until they are released by an interruption of the current brought about by the operation of some external contact or relay adapted to be actuated at a predetermined point during the starting period.

For contacts designed for operation with medium sized motors, little difficulty is experienced in the use of alternating current for the contactor coils. In the larger sizes, however, the heating of the coils and core is a serious objection. The heating effect often becomes excessive and results in a breakage of the slate or marble mounting of the contactors because of the uneven heating and expansion of the mounting material.

Another difficulty encountered in the use of alternating current holding coils for the contactors arises out of the starting characteristics of synchronous motors. When a synchronous motor is started, a heavy current is drawn from the line, and if the motor is located at the end of a long or relatively light power line, the voltage drops far below normal value. As a result, although the first contactor may operate, the next one to close will be unable to operate because of the low line voltage.

Furthermore, after the motor has been started and placed on the line, a momentary dip in voltage will cause the contactors to open and thus throw the motor off the line. While a maintained drop in voltage should result in a disconnection of the machine, a momentary dip, due to a temporary short-circuit or a lightning discharge or other momentary local disturbance, is not dangerous and in most instances it is desirable to keep the motor on the line. With alternating contactors, however, the synchronous motors on the system will shut down and seriously affect normal production when a momentary dip occurs, whereas, if the contactors remain closed during the temporary voltage drop the motors will remain on the line and continue in normal operation after the restoration of the voltage.

In order to overcome such objectionable features and disadvantages as are inherent in a starting system dependent upon magnetic contactors actuated by alternating current, I have devised improved means for protecting and properly governing the operation of synchronous motors during normal and abnormal operating conditions. As opposed to present contactors, I propose to employ means adapted to hold the magnetic contactors closed irrespective of the fluctations in voltage of the power supply, such means being adapted to open the contactors at a predetermined low value of voltage. I may also provide means for governing the time of release of the contactor after low voltage occurs.

In order to permit the contactors to close on very low voltages, such as occur when the machine is connected at the end of a long power line, I may provide means for effectively closing the contactors at voltages far below normal. Such means may consist of a suitable relay or other device adapted to operate even though the voltage of the line has dropped to a much lower value than that ordinarily required to close the contactors.

According to my invention, I may eliminate the heating characteristics of alternating current magnetic contactors by employing means adapted to energize the contactors by direct current as soon as excitation is applied to the machine, without destroying the ability of the contactors to close on alternating current. By using direct current there will be no reversal of magnetism in the contactor core and consequently no heating, aside from that due to the resistance of the coil. Furthermore, by using direct current coils I may prevent the excessive noises present in alternating current contactors, especially of the larger sizes. Also, upon failure of the excitation voltage I may disconnect the motor from the line through the operation of suitable means actuated by the failure of the excitation voltage.

Since a synchronous motor at standstill has the essential properties of a transformer, an alternating voltage applied to the armature terminals will cause an alternating current to flow in the armature winding, inducing a secondary voltage in the motor field. When the rotor is at rest, this secondary voltage has the same frequency as the line voltage but its frequency decreases as the motor gains speed, becoming zero at synchronous speed. While the motor is accelerating, currents of declining frequency flow through the field circuit and relays actuated by this decline in frequency may be utilized to operate suitable magnetic contactors when the motor has reached certain predetermined speeds in coming up to synchronism.

To insure the proper operation of the magnetic contactors at predetermined points in the starting period of the motor, I may utilize the change in frequency of the field circuit. Thus, I may include a relay in the field circuit of the motor responsive to the induced current in the field winding. The relay may be of such a character that it operates to connect the field to a source of excitation voltage, and at the same time actuates suitable contacts whereby the direct current magnetic contactor coils are energized to hold the motor on the line. The instant during the starting period at which the relay is operated may be just before the point at which the machine is pulled into synchronism or it may be at a point considerably earlier than this, the exact point depending upon the frequency for which the relay is adjusted.

The control system I propose may be made entirely automatic upon the actuation of a suitable contact, such as a push button. The closing of the push button contact may result in the closing of other relay contacts, and the energizing of the alternating current contactor coils may be adapted to close the line switch. After the motor has attained a suitable speed permitting it to be pulled into synchronism, the relay responsive to the condition of the field circuit may be actuated to apply excitation voltage and close still other contacts, causing a breaking of the alternating current contactor coil circuit and the actuation of the direct current contactor coil. Other contacts and devices may also be included in my control system to fully protect the motor under all normal and abnormal operating conditions.

Such features as I have discussed as well as other provisions for insuring efficient operation of a synchronous motor during starting and running may be better understood by considering the following detailed description which is to be taken in conjunction with the accompanying drawings, wherein—

Figure 1:
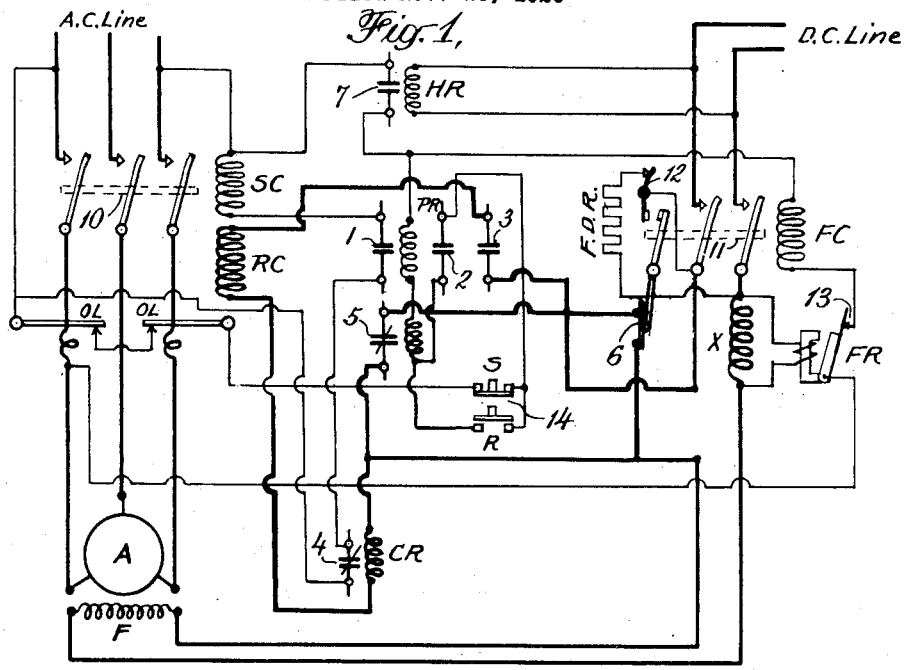
Fig. 1 is a circuit diagram of my improved starting system including a direct current coil in series with a motor field.

In the embodiment of the invention illustrated in the drawings, the armature A of the motor is supplied with polyphase alternating current from the a—c supply, a switch 10 being provided to disconnect the motor from the line. The field F of the motor is supplied with excitation current from the d—c line through the disconnecting switch 11. In circuit with the field F and adapted to be employed only during starting is the field discharge resistance FDR.

In the circuit illustrated, the armature switch 10 is operated by electromagnetic means including an alternating current starting coil SC and a direct current running coil RC. The a—c coil SC is adapted to close on voltages far below normal and is energized by current drawn from the a—c line through a control circuit, which is shown connected across the outside lines of the a—c supply. This control circuit includes the coil SC, a combined pilot relay and low voltage release PR, a control relay CR, and a double push button switch 14. The circuit illustrated in Fig. 1 includes in addition a holding relay HR in the circuit of the pilot relay PR. Push button R of the switch 14 may be actuated to close the control circuit to start the motor and push button S may be actuated to open the control circuit when the motor is to be stopped.

The direct current coil RC operating the switch 10 is energized by direct current drawn from the d—c line through a control circuit including the pilot relay PR, the control relay CR and either contact 6 (Fig. 1) or contacts 8 and 9 (Fig. 2), depending upon whether the coil RC is in series or in parallel with the motor field F. In both series and parallel connections the contacts 6, 8 and 9 are controlled by the operation of a frequency relay FR, as will be explained later.

The field switch 11 is operated by electromagnetic means including the field coil FC energized by alternating current drawn from the a—c line through a control circuit including the frequency relay FR, and in the series connection the holding relay HR as well. The frequency relay FR is connected across a suitable reactance X in the field circuit and is energized by the current induced in the motor field during starting. The reactor X has low resistance and high inductance and the coil of the relay FR has high resistance and low inductance, as compared with the reactor. These quantities are so proportioned that at normal line frequency the impedance of X will be greater than that of the relay coil and at substantially zero frequency the impedance of the relay coil will be greater than that of X. Consequently, at the starting instant the greater part of the induced field current will be diverted through the relay coil because the frequency is substantially that of the line, and the relay will close. As the motor approaches synchronism the greater part of the current will flow through X because of its lower impedance at lower frequency, and the relay will drop open. The operation of the relay actuates a contact 13 in the circuit of the switch coil FC and thus controls the opening and closing of the field switch 11.

The operation of the control circuit for the a—c switch coil SC may be better understood by describing the operation of the various contacts upon starting of the motor. When it is desired to start the motor, the push button R of the switch 14 is depressed momentarily to close a circuit from one side of the a—c line through the closed contact 7 of the holding relay HR (Fig. 1), the coil of the pilot relay PR, the contacts of push button R, the contacts of the closed push button S, the overload relay OL to the other side of the a—c line. As soon as the coil of the pilot relay PR is energized, the contacts 1, 2 and 3 are closed and the contact 5 (Fig. 1) is opened. The closing of the contact 2 establishes a seal around the push button R which may then be released. The circuit will then be from one side of the a—c line through the relay OL, the closed contacts of the button S, the closed contact 2 of the relay PR, the coil of the relay PR, the closed contact 7 of the relay HR (Fig. 1) to the other side of the a—c line.

Simultaneously with the closing of the contact 1 of the relay PR, a circuit is established through the a—c switch coil SC from one side of the a—c line through the coil SC, the closed contact 1, of the relay PR, the closed contact 4 of the control relay CR to the other side of the a—c line. The coil SC is thus energized and the switch 10 is closed and a—c is applied to the terminals of the motor armature A and the motor is started.

As the motor comes up to speed, the induced current in the field F is discharged through the field discharge resistance FDR, the circuit being from one terminal of the field, through the reactor X, the resistance FDR, the closed switch contact 12, the closed contact 6, back to the other terminal of the field. Because of the relation between the impedance of the reactor X and the coil of the relay FR the greater part of the induced field current flows through the relay coil and the relay FR is actuated to open the contact 13, thereby opening the circuit of the coil FC which thus permits the switch 11 to remain open. As the motor approaches synchronism, the current passing through the relay becomes less and less and the frequency lower and lower until at a predetermined value the relay drops open to close the contact 13 and complete the circuit of the coil FC, which then actuates the switch 11 and throws the field on the d—c line. Simultaneously with the closing of the switch 11, the contact 12 is opened and the field disconnected from the discharge resistance.

Figure 2:
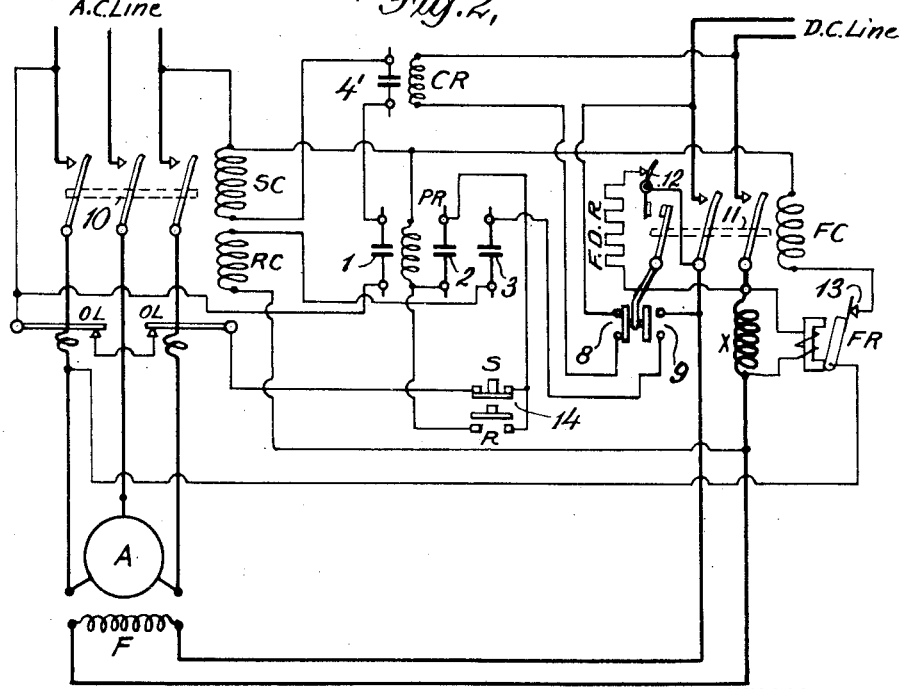
Fig. 2 is a circuit diagram of my improved starting system including a direct current coil in parallel with a motor field.

The closing of the field switch 11 actuates the contacts 6 of Fig. 1 and 8 and 9 of Fig. 2, which thus complete the control circuit for the d—c coil RC. In Fig. 1 the opening of the contact 6, which formerly short-circuited the d—c control circuit, establishes a circuit for the control relay CR from the d—c line, through the closed contact 3 of the relay PR, the d—c coil RC, the coil of the relay CR, back to the line. The passage of the current energizes the d—c coil RC and the relay CR, which thus opens the contact 4, thereby breaking the circuit of the a—c coil SC. The d—c coil RC thus continues to hold the armature switch 10 closed while the a—c coil SC is disconnected from the line.

According to the arrangement illustrated in Fig. 2, the closing of the field switch operates to open the contact 8 and close the contact 9. The d—c coil circuit is thus established from one side of the d—c line, through the closed contact 9, the closed contact 3 of the relay PR, the coil RC, back to the other side of the d—c line. Simultaneously with the closing of the contact 9, the opening of the contact 8 opens the circuit of the coil of the relay CR thus allowing the contact 4 to open, whereby the circuit of the a—c coil SC is broken, and the switch 10 held closed under the sole action of the d—c coil RC.

Consequently, as soon as excitation voltage is applied to the field of the machine upon reaching synchronism, the control circuit is actuated to close the circuit of the d—c coil RC and open the circuit of the a—c coil SC, whereby the armature switch 10 is held closed by the sole action of the d—c coil RC during the running of the machine. While the machine is being brought up to speed, the a—c coil SC is in circuit to hold the switch 10 closed while the d—c coil circuit is entirely out of the circuit of the motor field. In Fig. 1 the d—c coil is held out of the field circuit by the short-circuiting action of the contact 6, while in Fig. 2 the circuit of the coil RC is kept open by the open contact 9.

If after the motor is in normal operation an excessive overload should occur, the overload relays OL will be operated to break the circuit of the coil of the pilot relay PR. The de-energizing of the relay PR will open the contacts 1, 2 and 3 and thus open the circuits of both the coil RC and the coil SC thereby allowing the switch 10 to throw the motor off the line. Since the coil RC is in series with the field in the circuit of Fig. 1, the breaking of the contact 3 of the relay PR would open the field of the motor while it is drawing normal current, were it not for the contact 5 which closes upon opening of the relay PR to short circuit the coil RC and maintain the field circuit intact. The breaking of the circuit of the coil RC in Fig. 2 may be carried out without the aid of a short circuiting contact because the coil is shunted across the field circuit.

After the switch 10 has opened to throw the motor off of the line, the motor will slow down and the frequency relay will operate to open the circuit of the coil FC thereby opening the switch 11 and connecting the field across the discharge resistance FDR. The contacts 6 or 8 and 9 will then return to their normal position and the entire control circuit is ready to be again operated upon closing of the overload relays OL.

If the d—c supply should fail after the motor is in operation the coil of the holding relay HR (Fig. 1) will be de-energized and the contact 7 will open to break the circuit of the coil of the relay PR, thereby opening contacts 1, 2 and 3 and breaking the circuit of the coil RC and the coil SC. A failure of the d—c supply for the circuit of Fig. 2 will cause the coil RC to be de-energized and the switch 10 will be opened. Since the circuit of the coil SC has previously been opened by the contact 4 of the relay CR, the coil SC cannot be actuated to hold the switch 10 closed.

To cause a disconnection of the motor from the line when the a—c voltage falls below and remains below a predetermined low value, the pilot relay is adapted to act as a slow low voltage release device. If the voltage remains for a considerable period below the value of the voltage for which the pilot relay is adjusted, the relay will open and the contacts 1, 2 and 3 will drop open to break the circuits of the coils RC and SC and thus throw the motor off of the line. The pilot relay may be provided with a suitable timing device whereby the relay will not operate until a predetermined period has elapsed after the occurrence of low voltage. The relay may thus be made inoperative for momentary dips of a more or less temporary character, in the voltage line, or for dips having a duration less than the time interval for which the relay is set.

The embodiment of the control system illustrated and described provides a momentary duty a—c starting coil adapted to close on voltages considerably below normal, and a d—c running coil adapted to hold the switch contactors closed during normal operation of the machine. The illustrated embodiment also provides means for disconnecting the motor from the line under abnormal conditions such as excessive overload, failure of excitation current and prolonged, low line voltages.

It is to be understood that the arrangement of the various elements of my improved starting system may be varied without departing from the scope of the invention, which is not limited to the particular embodiment shown and described, but includes such modifications thereof as fall within the scope of the appended claims.

I claim:

1. In a control system for a synchronous motor having an armature winding and a field winding, the combination with an electro-magnetic switch for applying voltage to the armature winding of the motor, of means for closing said switch, and means responsive to the electrical condition of the motor field winding and independent of said first means for holding said switch in closed position, said second named means being arranged to cause said first named means to become inoperative when said second named means is actuated.

2. In a control system for a synchronous motor having an armature winding and a field winding, the combination with an electro-magnetic switch for applying voltage to the armature winding of the motor, of a source of direct current, alternating current means for closing said switch, and means energized by said direct current for holding said switch in closed position and causing said first named means to become inoperative.

3. In a control system for a synchronous motor having an armature winding and a field winding, the combination with a source of alternating current voltage, of an electro-magnetic switch for applying said voltage to the armature winding of the motor, alternating current means for closing said switch, direct-current means for holding said switch in closed position and causing said alternating current means to become inoperative, and means for opening said switch when the voltage of said source falls below a predetermined value.

4. In a control system for a synchronous motor having an armature winding and a field winding, the combination with a source of alternating current voltage, of a source of direct current, an electro-magnetic switch for applying alternating current voltage to the armature winding of the motor, alternating current means for closing said switch, means energized by said direct current and responsive to the electrical condition of the motor field winding for holding said switch in closed position, and causing said alternating current means to become inoperative, and means for opening said switch when the voltage of said alternating current source falls below a predetermined value.

5. In a control system for a synchronous motor having an armature winding and a field winding, the combination with an electro-magnetic switch for applying voltage to the armature winding of the motor, of means for closing said switch, means for holding said switch in closed position, and means responsive to the electrical conditions of the motor field winding and connected in circuit therewith at all times for disconnecting said closing means and operating said holding means.

6. In a control system for a synchronous motor having an armature winding and a field winding, the combination with an electro-magnetic switch for applying voltage to the armature winding of the motor, of means for closing said switch, a source of direct current, means adapted to be energized by said direct current for holding said switch in closed position, and means connected in circuit with said field winding at all times for disconnecting said closing means and operating said holding means.

7. In a control system for a synchronous motor having an armature winding and a field winding, the combination with an electro-magnetic switch for applying voltage to the armature winding of the motor, of means for closing said switch, means for holding said switch in closed position, and means responsive to the electrical condition of the motor field winding for simultaneously causing said closing means to become inoperative and said holding means to be energized.

8. In a control system for a synchronous motor having an armature winding and a field winding, the combination with an electro-magnetic switch for applying voltage to the armature winding of the motor, of means for closing said switch, a source of direct current, means adapted to be energized by said direct current for holding said switch in closed position, and means responsive to the electrical condition of the motor field winding and connected in circuit therewith at all times for simultaneously disconnecting said closing means and operating said holding means.

9. In a control system for a synchronous motor having an armature winding and a field winding, the combination with an electro-magnetic switch for applying voltage to the armature winding of the motor, of means for closing said switch, a source of direct current, means adapted to be energized by said direct current for holding said switch in closed position, and means responsive to the electrical condition of the motor field winding and connected in circuit therewith at all times for disconnecting said closing means and operating said holding means when the motor attains a predetermined speed.

10. In a control system for a synchronous motor having an armature winding and a field winding, the combination with an electro-magnetic switch for applying voltage to the armature winding of the motor, of means for closing said switch, a source of direct current, means adapted to be energized by said direct current for holding said switch in closed position, and means responsive to the electrical condition of the motor field winding and connected in circuit therewith at all times for disconnecting said closing means and actuating said holding means when the motor reaches substantially synchronous speed.

11. In a control system for a synchronous motor having an armature winding and a field winding, the combination with an electro-magnetic switch for applying voltage to the armature winding of the motor, of means for closing said switch, a source of direct current, means energized by said direct current for holding said switch in closed position and causing said first named means to become inoperative, and means responsive to the electrical condition of the motor field winding for maintaining said holding means inoperative until the motor reaches a predetermined speed.

12. In a control system for a synchronous motor having an armature winding and a field winding, the combination with an electro-magnetic switch for applying voltage to the armature winding of the motor, of means for closing said switch, a source of direct current, means adapted to be energized by said direct current for holding said switch in closed position and causing said first named means to become inoperative, and means responsive to the electrical condition of the motor field winding for actuating said holding means when the motor reaches substantially synchronous speed.

In testimony whereof I affix my signature.

CHARLES TRUMAN HIBBARD.